United States Patent [19]

Wirges

[11] Patent Number: 5,137,124
[45] Date of Patent: Aug. 11, 1992

[54] PRESSURE TUBE PISTON UNIT

[75] Inventor: Winfried Wirges, Koblenz, Fed. Rep. of Germany

[73] Assignee: Stabilus GmbH, Koblens-Neuendorf, Fed. Rep. of Germany

[21] Appl. No.: 584,470

[22] Filed: Sep. 18, 1990

[30] Foreign Application Priority Data

Sep. 21, 1989 [DE] Fed. Rep. of Germany ....... 3931448

[51] Int. Cl.$^5$ .................................................. F16F 9/50
[52] U.S. Cl. .................................................... 188/282
[58] Field of Search ............... 188/300, 269, 282, 281, 188/322.15; 267/64.12, 64.15

[56] References Cited

U.S. PATENT DOCUMENTS

| | | | |
|---|---|---|---|
| 2,595,426 | 3/1952 | Thornhill | 267/64 |
| 3,976,287 | 8/1976 | Kendall et al. | 267/134 |
| 4,307,875 | 12/1981 | Schnitzuis | 188/282 X |
| 4,632,228 | 12/1986 | Oster et al. | 188/282 |
| 4,796,871 | 1/1989 | Bauer et al. | 188/282 X |

FOREIGN PATENT DOCUMENTS

| | | |
|---|---|---|
| 1223284 | 6/1987 | Canada . |
| 0115209 | 8/1984 | European Pat. Off. . |
| 3039801 | 5/1982 | Fed. Rep. of Germany . |
| 3301266 | 7/1984 | Fed. Rep. of Germany . |
| 3904866 | 8/1990 | Fed. Rep. of Germany . |
| 2534339 | 4/1984 | France . |
| 2087510 | 5/1982 | United Kingdom . |

Primary Examiner—Robert J. Oberleitner
Assistant Examiner—Lee W. Young
Attorney, Agent, or Firm—Brumbaugh, Graves, Donohue & Raymond

[57] ABSTRACT

A pressure tube piston unit (10) with a pressure tube (11) which is subdivided into a first working space (14) and a second working space (15) by a piston (12) adapted to be extended and retracted on a piston rod (13). The two working spaces are adapted to be in a lockable flow connection with each other via an externally actuable valve arrangement (18). The piston (12) is radially externally provided with an encircling groove (19) and a packing ring (20) is inserted into the groove. The groove (19) is provided with a radially inwardly directed widened portion, the widening being of a predeterminable height. The packing ring (20) inserted into the bottom of the groove (19) is capable of being displaced axially into the widened portion.

15 Claims, 1 Drawing Sheet

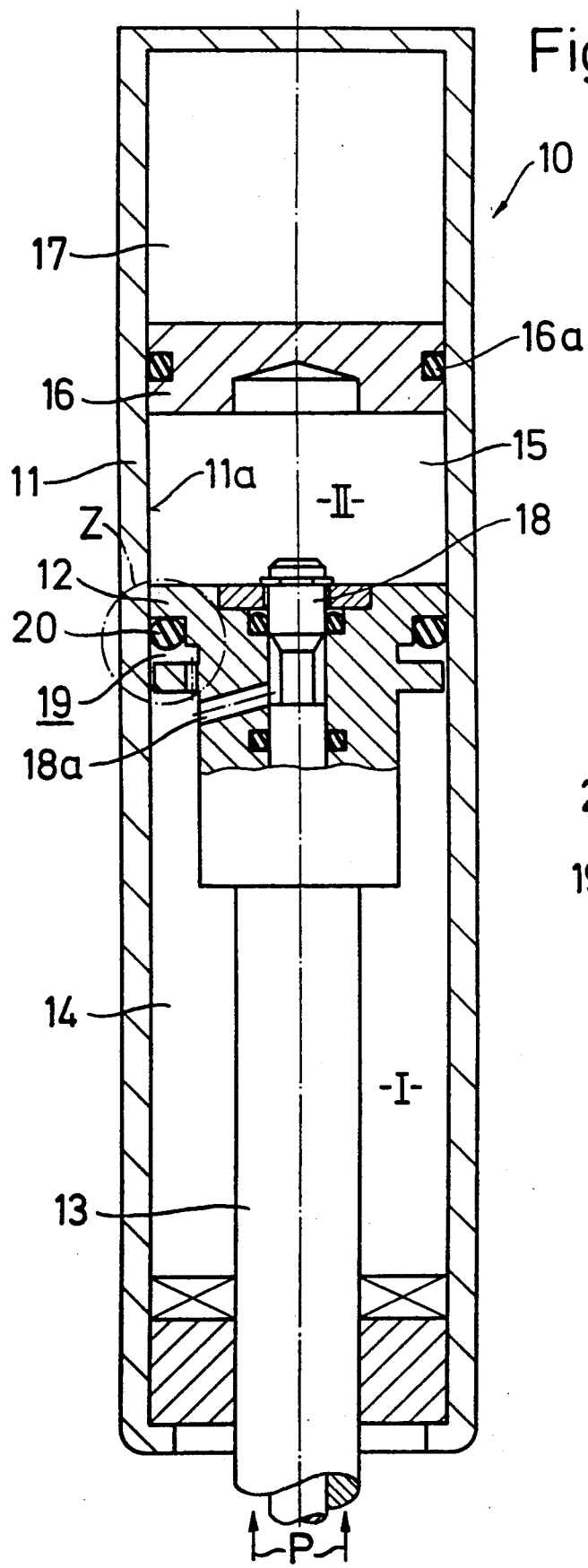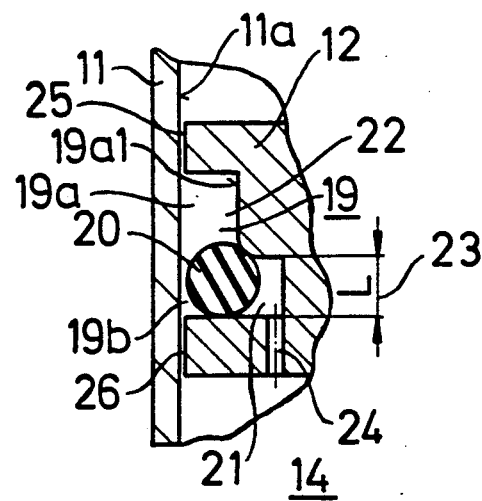

PRESSURE TUBE PISTON UNIT

The invention relates to a pressure tube piston unit comprising a pressure tube having one axis, two ends and a cavity, a piston rod which is guided in sealing-tight manner through at least one end and in the direction of the axis while being axially movable in respect of the pressure tube, a piston unit connected to the piston rod inside the cavity and which, inside the cavity, defines in respect of each other two working spaces which are filled with pressurised fluid, a transfer connection between the two working spaces, an externally controllable valve arrangement in this transfer connection for optional opening or closing of the transfer connection, an annular groove in an outer peripheral surface of the piston unit and open towards the inner peripheral surface of the pressure tube and, accommodated in this annular groove, a sealing ring which bears in a sealing-tight position against the inner peripheral surface of the pressure tube while at the same time bearing in sealing-tight manner on a boundary surface of the annular groove so that it seals an auxiliary connection between the two working spaces.

Such pressure tube piston units are known for example from DE-OS 33 01 266. They are used for example for the infinitely variable adjustment of the height of items of seating furniture, table tops, VDU control panels etc. It is not out of the question that such items of furniture become overloaded. Such overloads can lead to destruction of the seals, valve arrangements etc. in the lifting apparatus. Thus, the lifting apparatus can be put out of action and destroyed, which must be avoided.

The invention is based on the problem of providing a safeguard against overloading a pressure tube piston unit of the type described at the outset.

In order to resolve this problem, it is according to the invention proposed that the packing ring be axially adjustable into a non-sealing position by a difference in pressure between the two working spaces occurring at a predetermined loading of the unit.

In order that the pressure tube piston unit may be rendered ready for use once again after the overload safeguard has been operated, it is envisaged that the packing ring be capable of being returned to its sealing position by a reversal of the direction of the pressure difference occurring when the loading on the unit is relieved.

The transition from the sealing position to the non-sealing position by axial movement of the packing ring can be made possible for example by the annular groove comprising a first axial portion of lesser radial depth in which the packing ring is accommodated in its sealing position and a second axial portion of greater radial depth in which the packing ring is accommodated in its non-sealing position.

In the simplest case, the auxiliary connection consists of at least one annular gap adjacent the annular groove in an axial direction and disposed between the inner peripheral face of the pressure tube and the outer peripheral face of the piston unit.

It is advantageous if, in its sealing position, the packing ring bears in sealing-tight manner on a bottom surface of the axial portion of lesser radial depth while at the same time it bears in sealing-tight manner on the inner peripheral surface of the pressure tube and if, in the non-sealing position, the packing ring at least partially enters a radially inwardly directed depression in the axial portion of greater radial depth and no longer bears in sealing-tight manner on the inner peripheral face of the pressure tube. With this solution, it can be expected that the packing ring will not leave its sealing position when the piston is displaced in respect of the pressure tube under normal working conditions.

In order to ensure a reliably and rapidly responding return of the packing ring to its sealing position upon completion of the overload function, it is suggested that in the non-sealing position of the packing ring, a chamber is formed between the packing ring and the annular groove and that this chamber communicate with that working space in which the greater pressure occurs when the unit is relieved of loading.

The invention is applicable particularly if the piston rod is guided through only a first end of the pressure tube, a first working space existing on the piston rod side of the piston unit and a second working space on the side of the piston unit which is remote from the piston rod. The result is that, in its sealing position, the packing ring is closer to the second working space while in its non-sealing position it is closer to the first working space.

The invention can be used particularly in the case of gas springs and hydropneumatic lifting apparatus.

The response point of the overload valve can be varied by variously dimensioning the annular groove, by variously dimensioning the packing ring cross-section and by varying the Shore hardness of the packing ring material. Preferably, the packing is of circular cross-section and produced from an elastomeric material.

Further advantageous measures are described in the sub-claims. The invention is described hereinafter and is illustrated in the accompanying drawings in which:

FIG. 1 shows a section through a pressure tube piston unit with an overload safeguard against the invention disposed in the piston which is carried by a piston rod and FIG. 2 shows a detailed view of the overload safeguard according to the portion "Z" in FIG. 1.

The pressure tube piston unit 10 shown in FIG. 1 consists essentially of a pressure tube 11 in which a piston 12 guided on a piston rod 13 is adapted to retract and extend. The piston 12 subdivides the pressure tube 11 into a first working space 14 and a second working space 15 which are filled with a hydraulic medium. The second working space 15 remote from the piston rod 13 is divided by a floating separating piston 16 from a pressurised gas filling 17. The separating piston 16 is sealed by a separating piston packing 16a in respect of the inner wall of the pressure tube 11.

Provided in the piston 12 is a valve arrangement 18 which can, via a transfer port 18a, establish a flow communication between the first working space 14 and the second working space 15. The valve arrangement 18 can be triggered by a release device not shown, so that the piston 12 is infinitely displaceable in the pressure tube 11.

As FIG. 2 shows, the piston 12 is provided radially outwardly with an encircling groove 19 into which an elastomeric packing ring 20 is capable of being inserted. The groove 19 has a groove bottom 22 which, as is shown in FIG. 1, corresponds substantially to the dimensions of the packing ring 20. As an over-pressure safeguard according to the invention, the groove 19 is provided with a widened portion 21 of a predetermined height 23. The widened portion 21 is directed radially inwardly and is connected to the first working space 14 via a bore 24. With a correspondingly differently disposed widening 21, the bore 24 may also be extended into the second working space 15.

The two working spaces 14, 15 are filled with liquid. Via the separating piston 16, there is adjacent the working space 15 a gas-filled space 17 which contains a pressurised gas.

When the unit according to FIG. 1 is relieved of loading and the valve arrangement 18 is closed, the position of the piston 12 and of the piston rod 13 in respect of the pressure tube 11 is fixed. When this happens, a state of equilibrium is established between the pressures in the working space 14 and in the working space 15. In this state of equilibrium, the pressure in the working space 14 is greater than the pressure in the working space 15. Therefore, this is based on the fact that the pressure in the working space 14 is applied to a smaller area of the piston than the pressure in the working space 15. Since, then, the pressure in the working space 14 is greater than the pressure in the working space 15, as a result of the pressure difference between the greater pressure in the working space 14 and the lesser pressure in the working space 15, the packing ring 20 is maintained in the sealing position which is shown in FIG. 1. During this time, the packing ring bears in sealing-tight manner against the inner peripheral surface 11a of the pressure tube 11 and on the bottom surface 19a1 of the axial portion 19a of the annular groove 19. The cross-sectionally circular packing ring 20 is thereby so dimensioned that it bears in sealing-tight manner on the inner peripheral face 11a and on the bottom face 19a1. Thus, the gap 25 between the piston 12 and the pressure tube 11 is sealed. If a loading P is exerted on the pressure tube piston unit 10 in such a way that the piston rod 13 is pressed towards the upper end of the pressure tube 11 and if at the same time the valve arrangement 18 is closed, then the pressure in the working space 15 rises. The pressure in the working space 15 can thereby become greater than the pressure in the working space 14. This means that the pressure difference between the two working spaces 14, 15 is reversed. At a predetermined magnitude of this reversed pressure difference, the packing ring 20 moves in the axial portion 19b of the groove 19. Since this axial portion 19b has a greater radial depth than the axial portion 19a, the packing ring is able to move radially inwardly in the depression 21 so that it loses the sealing-tight contact with the inner peripheral surface 11a of the pressure tube 11. Now there is a transfer connection through the gap 25, 26, so that the pressure in the working space 15 is reduced. Therefore, the packing ring 20 functions as an over-pressure valve which prevents an excessive pressure building up in the working space 15.

In the non-sealing position of the packing ring 20 according to FIG. 2, the depression 21 forms with the packing ring 20 a chamber which communicates with the working space 14 via the bore 24. If the loading P is removed, then the state of equilibrium is restored, i.e. the pressure in the working space 14 is once again greater than the pressure in the working space 15. The increased pressure of the working space 14 then takes effect in the chamber 21 and acts upon the radially inner side of the packing ring 20. Thus, the packing ring 20 is again restored to the sealing position shown in FIG. 1.

By varying the Shore hardness of the packing ring and by varying the radial difference in depths between the two axial portions 19a and 19b of the annular groove 19, it is possible to vary the response point of the overpressure valve.

In normal operation, the packing ring 20 usually remains in its sealing position shown in FIG. 2. This can be made possible readily in that the friction between the packing ring 20 and the inner peripheral surface 11a is adjusted to be less than the friction between the packing ring 20 and the groove bottom 19a1. However, even if, after opening the valve arrangement 18, there should possibly be an upwards displacement of the piston 12 which might result in the packing ring 20 reaching the position shown in FIG. 2, then this is harmless, because after closure of the valve arrangement the pressure difference between the greater pressure in the working space 14 and the lesser pressure in the working space 15 brings about a positive return of the packing ring 20 to the position shown in FIG. 1.

I claim:

1. A pressure tube piston unit (10) comprising a pressure tube having an axis, two ends and a cavity (14, 15, 17), a piston rod (13) which is guided in sealing-tight manner through at least one end and in the direction of the axis while being axially movable in respect of the pressure tube (11), a piston unit (12) connected to the piston rod (13) inside the cavity (14, 15, 17) and which, inside the cavity, defines in respect of each other two working spaces (14, 15) which are filled with pressurized fluid, a transfer connection (18a) between the two working spaces (14, 15), an externally controllable valve arrangement (18) in said transfer connection (18a) for optional opening and closing of the transfer connection (18a), an annular groove (19) in an outer peripheral surface of the piston unit (12) and open towards an inner peripheral surface (11a) of the pressure tube (11) and, accommodated in said annular groove (19), a packing ring (20), said piston rod (13) being in an axially balanced condition with respect to said pressure tube (11) when said transfer connection (18a) is closed and said pressure tube piston unit (10) is free of external axial load, said balanced condition being the result of equal opposite first and second axial fluid forces, said first axial fluid force being exerted by a first partial volume of pressurized fluid contained in a first one (14) of said working spaces (14, 15) and exerting a pressure onto a first axially directed piston face means allocated to said first working space (14), said second axial fluid force being exerted by a second partial volume of pressurized fluid contained in a second one (15) of said working spaces (14, 15) and exerting a pressure onto second oppositely directed piston face means allocated to said second working space (15), said first piston face means having a smaller area than said second piston face means and as a result thereof said pressure in said first working space (14) has a higher value than said pressure in said second working space (15) for producing said equal fluid forces, a balancing pressure difference existing between the higher pressure in said first working space (14) and the lower pressure in said second working space (15), said annular groove (19) having a first axial portion (19b) of larger radial depth closer to said first working space (14) and a second axial portion (19a) of smaller radial depth closer to said second working space (15), said first axial portion (19b) having radially outer primary exit means (26) towards said first working space (14) and radially inner secondary exit means (24) towards said first working space (14), said second axial portion (19a) having exit means (25) towards said second working space (15), said packing ring (20) being held in said balanced condition within said second axial portion (19a) by said balancing pressure difference with said packing ring (20) sealingly engaging said inner peripheral surface (11a), said exit means (25) towards said second working space (15) being closed and said primary exit means (26) and said secondary exit means (24) being open, application of a predetermined external load to said pressure tube piston unit (10) causing said pressure in said second working space (15) to increase beyond the pressure within said first working space (14) such that a predetermined load responsive pressure difference is created between a larger pressure in said second working space (15) and a smaller pressure in said first working space (14), said predetermined load responsive pressure difference causing said packing ring (20) to be moved towards said first axial portion (19b) with said packing ring (20) being lifted from sealing engagement with said internal peripheral surface (11a), said exit means (25) towards said second working space (15) being opened, said radially outer primary exit means (26) remaining open and an annular chamber (21) being formed by said packing ring (20) and a radially inner annular part of said first axial portion (19b) of said groove (19), said annular chamber (21) being substantially closed towards the remaining part of said groove (19) and being in communication with said first working space (14) through said secondary exit means (24), removal of said predetermined axial load causing an increase of pressure in said first working space (14) and said annular chamber (21), said increasing pressure in said first working space (14) and in said annular chamber (21) moving said packing ring (20) back into said second axial portion (19a) with said packing ring (20) returning into sealing engagement with said inner peripheral surface (11a), such as to reconstitute said balanced condition.

2. A pressure tube piston unit as set forth in claim 1, said exit means (25) from said groove (19) towards said second working space (15) comprising an annular gap (25) between said piston unit (12) and said inner peripheral surface (11a).

3. A pressure tube piston unit as set forth in claim 1, said radially outer primary exit means (26) between said groove (19) and said first working space (14) comprising a further annular gap (26) between said piston unit (12) and said inner peripheral surface (11a).

4. A pressure tube piston unit as set forth in claim 1, said secondary exit means (24) from said groove (19) towards said first working space (14) comprising at least one bore within said piston unit (12).

5. A pressure tube piston unit as set forth in claim 1, said second axial portion (19a) of said annular groove (19) having a substantially cylindrical bottom (19a1) with said packing ring (20) ongoing said cylindrical bottom surface (19a1) when being accommodated within said second axial portion (19a) of said groove (19).

6. A pressure tube piston unit as set forth in claim 5, said bottom surface (19a1) having a substantially circularly rounded edge adjacent said first axial portion (19b).

7. A pressure tube piston unit as set forth in claim 5, said packing ring (20) being secured within said second axial portion (19a) by frictional engagement with said bottom surface (19a1), the friction force between the packing ring (20) and said bottom surface (19a1) being larger than a friction force occurring between the packing ring (20) and the inner peripheral surface (11a).

8. A pressure tube piston unit as set forth in claim 1, said piston rod (13) being guided only through one end of said pressure tube (11), said first working space (14) being adjacent said one end.

9. A pressure tube piston unit as set forth in claim 1, both said working spaces (14, 15) containing a pressurized gas.

10. A pressure tube piston unit as set forth in claim 1, both said working spaces (14, 15) being filled with a liquid, the liquid of at least one (15) of said working spaces (14, 15) being adjacent an elastic compensation space (17).

11. A pressure tube piston unit as set forth in claim 10, said elastic compensation space (17) being separated from said one working space (15) by a movable partition (16).

12. A pressure tube piston unit as set forth in claim 11, said compensation space (17) being filled with a pressurized gas.

13. A pressure tube piston unit as set forth in claim 1, said packing ring (20) having a substantially circular cross-section when viewed in a section containing an axis of said packing ring.

14. A pressure tube piston unit as set forth in claim 1, said packing ring (20) consisting of elastomeric material.

15. A pressure tube piston unit (10), comprising:
a pressure tube having an axis, two ends and a cavity (14, 15, 17);
an axially movable piston rod (13) guided in a sealing-tight manner through at least one end of the pressure tube (11);
a piston unit (12) connected to the piston rod (13) inside the cavity (14, 15, 17) and dividing said cavity into first and second working spaces (14, 15) which are filled with pressurized fluid;
a fluid transfer connection between said working spaces (14, 15);
externally controllable valve means (18) in the transfer connection (18a) for optional opening and closing of the transfer connection (18a);
an annular groove (19) in an outer peripheral surface of the piston unit (12) and open towards the inner peripheral surface (11a) of the pressure tube (11);
said annular groove (19) having a first axial portion (19b) of larger radial depth closer to said first working space (14) and a second axial portion (19a) of smaller radial depth closer to said second working space (15), said first axial portion (19b) having a radially outer fluid connection (26) with said first working space (14) and a radially inner fluid connection (24) with said first working space (14), said second axial portion (19a) having a fluid connection (25) with said second working space (15);
an elastic packing ring (20) received in the annular groove (19) and being axially movable between said first and second axial portions (19b and 19a);
said packing ring (20), in the absence of a predetermined pressure differential acting from said second working space (15) towards said first working space (14), normally being located within said second axial portion (19a) in simultaneous sealing engagement with said inner peripheral surface (11a) of the pressure tube (11) and the radially inner wall (19a1) of the second axial portion (19a), said packing ring (20) when located within said second axial portion (19a) closing said fluid connection (25) between said second axial portion (19a) and said second working space (15);

said packing ring (20) being movable axially from said second axial portion (19a) to said first axial portion (19b) upon the application of a predetermined external axial load to said pressure tube piston unit (10) giving rise to a predetermined load responsive pressure difference between said second working space (15) and said first working space (14) in excess of said predetermined pressure differential;

said packing ring (20) when located in said first axial portion (19b) contracting in diameter so as to be out of sealing engagement with said internal peripheral surface (11a), thereby opening said fluid connection (25) with said second working space (15), and so as to form with said first axial portion (19b) an annular chamber (21);

said annular chamber (21) being in communication with said first working space (14) through said radially inner fluid connection (24), so that upon removal of said predetermined axial load the resulting increase in pressure in said first working space (14) and in said annular chamber (21) causes said packing ring (20) to move back into said second axial portion (19a) with said packing ring (20) returning into sealing engagement with said inner peripheral surface (11a) and said radially inner wall (19a1), thereby closing said fluid connection (25) between said second axial portion (19a) and said second working space (15).

* * * * *

UNITED STATES PATENT AND TRADEMARK OFFICE
CERTIFICATE OF CORRECTION

PATENT NO. : 5,137,124

DATED : Aug. 11, 1992

INVENTOR(S) : Wirges

It is certified that error appears in the above-identified patent and that said Letters Patent is hereby corrected as shown below:

Col. 5, line 54, "ongoing" should read --engaging--.

Signed and Sealed this

Twenty-sixth Day of October, 1993

Attest:

BRUCE LEHMAN

Attesting Officer     Commissioner of Patents and Trademarks